Patented Dec. 7, 1948

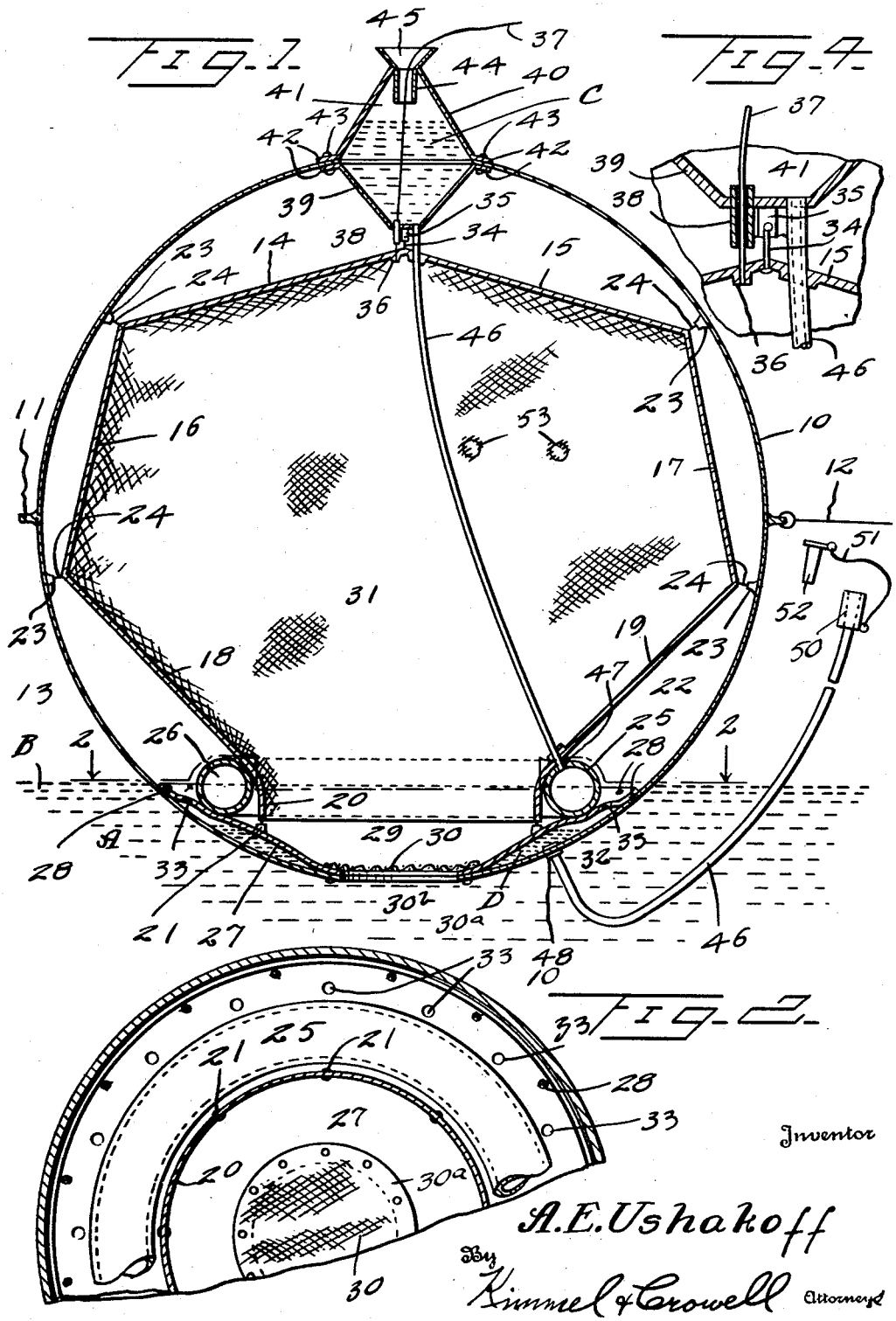

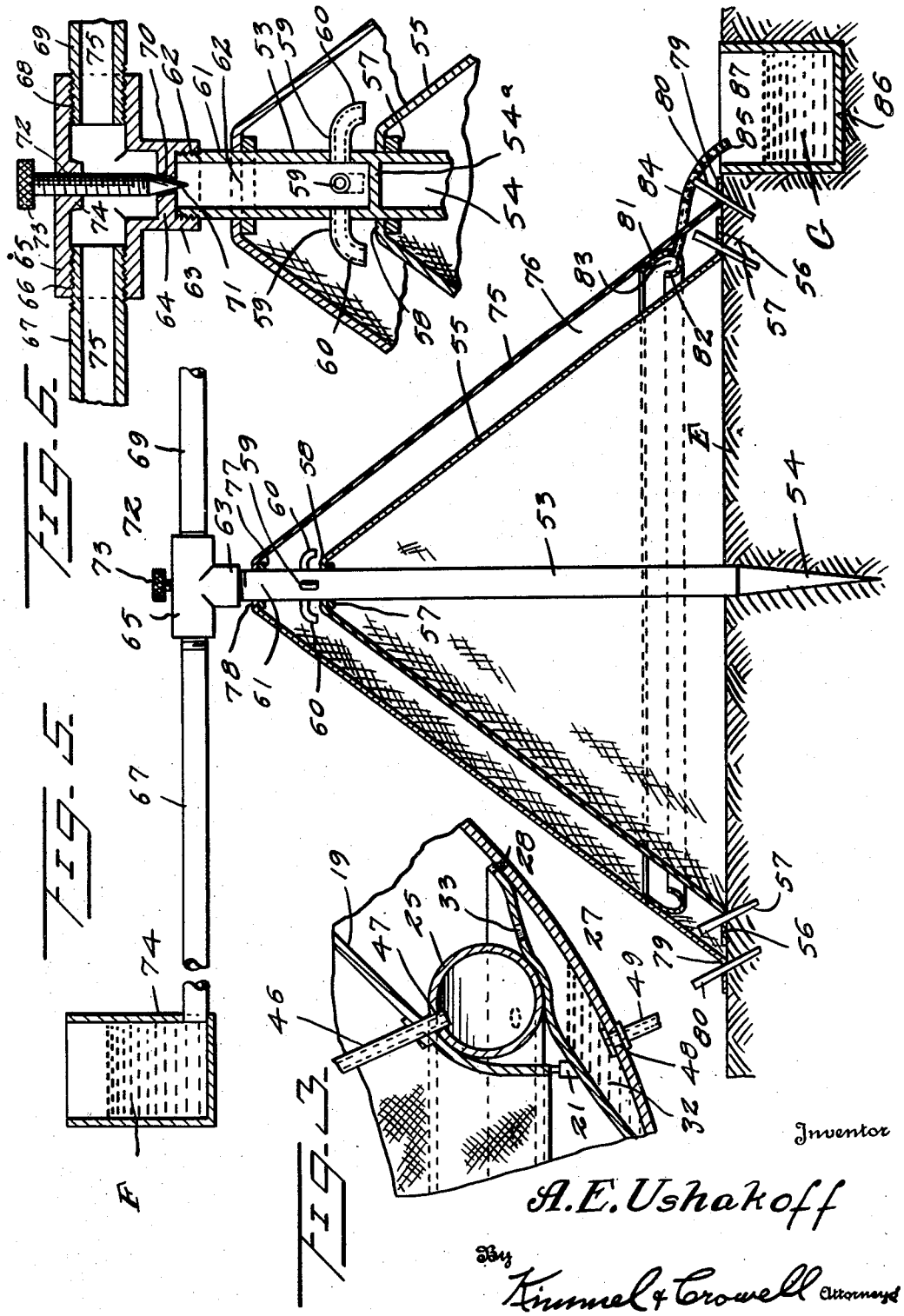

2,455,835

UNITED STATES PATENT OFFICE 2,455,835

INFLATABLE SOLAR STILL

Alexis E. Ushakoff, Beverly, Mass., assignor of thirty-five per cent to Stanley A. Baron, New Orleans, La., for the benefit of himself, Frederick A. Middleton and John J. Finnorn Application February 4, 1946, Serial No. 645,409

2 Claims. (Cl. 202—234)

This invention relates to improvements in life sustaining apparatus in times and places of emergency, and deprivation and more particularly to distillation of pure drinking water from salt or other impure water.

Where large bodies of salt water abound, as well as in otherwise arid regions where salt or other impure water affords the only fluid available for drinking purposes by humans, obtaining pure water for sustaining life by those forced to navigate such bodies of water, or live in such arid regions who do not have access to other sources of supply of drinking water, is a problem which this invention aims to solve.

One of the objects of the present invention is to provide a simple, efficient and inexpensive solar heat operated water apparatus adapted in one form for use on the ocean and in another form for use on land.

Another object thereof is to provide an emergency drinking water supplier for special use by those forced to make use of life boats, rafts, safety floats and the like for the purpose of exposing themselves for rescue.

A further object of this invention is to provide a pure water distilling float designed to be towed buoyantly along with an emergency or other water conveyance, which float is so shaped, arranged and constructed, as well as operated, that, when not in use, and before it is set upon the water, can be deflated so as to occupy very little space. It is well known that great demands are made upon the limited space of life rafts, etc. by the occupants thereof at all times, and it is for the purpose of reducing the size of the emergency drinking water supplier that it is made collapsible.

Another object of this invention is to provide a convenient, easily transportable and serviceable collapsible still for converting salt or other impure water to pure drinking water, freed from contaminating influences of various kinds.

Another object thereof is to provide a solar still for use as a floating appendage to a water navigating conveyance, as on a body of salt water, which is characterized by the fact that it is always ready for use to supply pure drinking water in progressive amounts, no matter what may be the sun's direction or elevation with respect thereto.

Another object of the invention is to provide a collapsible, pneumatically inflatable buoyant still capable of floating steadily on the water along with the conveyance occupied by the users thereof in balanced erectness at all times so as to expose to the direct rays of the sun at all angles wide-spread surfaces of an appreciable area to assure generation inside of the still of a continuous supply of waters of condensation which may be collected and drained off when desired.

A still further object of this invention is to provide a solar still of buoyant floating efficiency in which is arranged salt moisture spreading-out surfaces directly exposed to the heat of the sun at all times and water condensating surfaces spaced from but in close proximity to said sun exposed surfaces from which pure water may progressively be drawn off and collected.

Another object thereof is to provide, in a device of the kind described, an impure or salt water feeding device or means which delivers such water to the heat absorbing surfaces at a substantially constant rate.

Another object of the invention is to provide a solar still in which the heat absorbing surfaces are automatically kept clean from salt deposits and from other impurities.

Another object thereof is to provide means for pneumatically inflating the solar still for buoyant floating purposes in connection with which means are furnished for automatically keeping the pressure from exceeding its rated value.

Another object thereof is to provide, in conjunction with a device of the kind described, means for discharging the excess impure water delivered to the heat absorbing surfaces, without loss of internal pressure in the still.

A final object of the invention is to provide a pure water generating still adapted for service on land or on the water, without impairment or loss of efficiency.

With the above and other objects in view my invention consists in the combination, arangement and details of construction disclosed in the drawings, and specifications, and as more particularly pointed out in the appended claims.

In the drawings:

Figure 1 is a sectional elevation of my invention.

Figure 2 is a fragmental cross-section thereof.

Figure 3 is a fragmental exaggerated view showing the assembly of a ballast and pure water collecting device.

Figure 4 is a fragmental detail sectional exagerated view of the means for delivering salt water to the still in a measured constant stream.

Figure 5 is a sectional elevation of a modified form of my invention.

Figure 6 is a sectional exaggerated view in elevation of means for regulating the flow of salt water from the modified form of still to the heat absorbing surfaces.

Referring to the drawings, which are merely illustrative of my invention, I disclose the varied parts thereof. I provide a hollow body, preferably of a spherical or globular form to act as a floating drum or float. It is made from a material that yields a non-absorbent, non-porous, light, flexible, transparent membrane, and can be a suitable plastic substance.

This spherical hollow body 10 carries between its upper and lower ends, a flange 11 to which is attached at one end a tow line 12, also attached to the water navigating conveyance. Designed to be encased by this hollow body 10, as by means of a cover, is another hollow body, preferably shaped like a bag with its throat portion inverted, which body, in one highly convenient form, is polyhedral in contour so as to be provided with downwardly converging sides 18 and 19, joined to upwardly convergent sides 16, 17, joined to oppositely including sides 14 and 15 converging upwardly at the top of the bag. This polyhedral configuration of the bag is maintained when it is fully distended, as shown in Figure 1, as it is designed to be collapsible, being made of a porous, heat absorbing, light weight flexible material, dark or black in color. The throat portion of the bag is designated 20, and has its perimetral edge secured as at 21 to the intermediate part of a funnel-shaped flexible body or member 27 which has both its larger and narrow parts secured as at 28 to the lower end of the hollow body 10, which is open as at 30b at its south pole.

The spout of this funnel shaped body 27 is designated 29, and is disposed directly over the opening 30b. It will be observed that the enclosures or space between the funnel shaped body 27, and the adjacent wall of the drum 10 constitutes a collection receptacle into which fluid may progressively collect. The sides of this funnel shaped body, as at 33, may freely flex into the interior 22 of the drum 10. An annular hollow ballast tube 25 is anchored by any suitable means so as to rest upon the inner surface of the upper part of the funnel shaped body 27, and projecting into the said annular tube is the throat portion 20 of the inverted bag or hollow body 13.

As a means of supporting the sides of the polyhedral bag in relation to the enclosing walls of the drum 10, I attach short flexible tie ropes or pieces 24, to indentable portions 23 of the inner surface of the drum 10, and also to the corners which join together angularly opposed sides of the bag. The bag is thus seen to be flexibly supported or jointed at its diverse corners to the drum or shell 10, while its throat portion 20 is attached to the drum at its lower end as already explained.

At its upper end the bag 13 is also attached at one of its corners by a tie member 34 to the lower end of a salt or impure water distributor, conical in cross-section. There is accurately centered rigidly between the drum 10 and bag 13, the spout end of the raw water distributor because the lower part thereof is a funnel-shaped member 39, which is directly attached to the bag, while the upper closure section 40 thereof is also funnel-shaped and converges upwardly so as to be diametrically in alinement with a medial line of the shell 10. The distributor thus has a one point suspension means for the bag directly at its center line. Both funnel-shaped sections 39 and 40 of the impure water distributor have base flanges 42, 43 formed upon them, which are placed in abutting relationship so as to embrace the material of the drum 10, being fastened to the latter by means of the fasteners 43. Extending down into the top of the distributor member is a small funnel, the spout 44 thereof projecting into the hollow interior of the distributor in line with the innermost attached end thereof, while the outwardly flaring portion thereof, 45, projects beyond the distributor.

The funnel-shaped flexible body 27 is formed in the vicinity of the inner surface of shell 10, with perforations 33 flanked by the outer surfaces of the ballast tube 25, as a means of allowing waters of condensation tricking down the sides of the inner surface of shell 10, to pass into the collection chamber 32. A flexible hose or tube 46 is connected at one end to the discharge end of the distributor, and at its opposite end it projects into the ballast tube interior 26, as at 47. Another flexible tube or hose 49 has one end thereof coupled as at 48 to the shell material 10, so as to communicate with the interior of the water collection chamber 32. At the outer end of this hose 49, is a tubular member 50 into which may be removably fitted a wedge shaped plug 52 attached by a string 51 to this tubular member 50.

A string element 37 attached at its lower end to a part of the upper end of the bag 13, passes into a fixed guide tube located just below the distributor discharge spout, through the length of the distributor and comes out of the funnel inlet 45, at the upper end of the latter.

The foregoing construction is designed for use on the surface of a body of water. For use on land, in arid communities and other places where pure water is unobtainable in sufficient quantities, the construction which is employed with equally satisfactory results is illustrated in Figures 5 and 6. Here I arrange a tent-like formation of outer and inner membranes 75 and 55 respectively in upwardly converging manner. The inner heat absorbing member 55 carried at the upper end of an anchoring post 53, whose sharply pointed lower end is secured, as at 54, in the ground or other surface. From collar 57 the membrane or member 55 diverges downwardly so that its lower marginal edge 56 is secured tightly down upon the under surface E by means of suitable stakes 57 embedded firmly in said under surface, and extending all around the conical contour of this member.

The post 53 is hollow inside, as shown at 54, and has short of its upper end, a partition 54a extending horizontally therein. A series of faucets 59 extend in radial directions from the post 53, directly above the parition 54a, and their discharge ends 60 curve around so as to direct jets of salt water, entering this tubular post at its uppermost end, down upon the sides of the member 55. The post carries at its uppermost end another collar 77 upon which is secured the upper converging end of the outer member or membrane 75 so that it also assumes a conical contour and has its major body portion diverging towards the under supporting surface E, where its marginal portion 79 is secured by stakes 80 driven firmly into the surface E. The spacing apart of collars 57 and 77 of the tubular post assures that the members 55 and 75 will be spaced apart throughout all points of their length, leaving an air space therebetween as at 76.

The post extends above the uppermost part 78 of the outer member 75, where a T-coupling is secured thereto, the main stem thereof 63 being threaded onto the post, while the branches 65 of the T-coupling, which extend in opposite directions receive separate pipe sections 67 and 69 respectively, their inner ends being threaded into these branches of the T-coupling. The pipe 67 extends over to a raw or salt water reservoir 74 maintained fixedly at an elevation higher than the post 53 into which it is designed to feed the raw water for distribution upon the inner member 55. The salt water contents of this reservoir is designated F.

The water emerges out of reservoir 74 under gravity, through pipe 67, comes out of the threaded end 66 of this pipe, where it is connected to the T-coupling, and may continue its line of flow over into the other pipe section 69 which is in line with pipe 67, for distribution of raw water to other outfits similar to the one now being described.

There is a regulating valve, in the form of a threaded needle 72, having its operating head 73 located above the T-coupling, and having its lower pointed stem 71 projecting into a correspondingly tapered passage 70 formed in a valve seat 64 located in abutting relation against the outermost end of tubular post 53. The tapering passage 70 is the sole source of supply of raw water from the reservoir 74 to the inner heat absorbing member 55. Only small quantities of raw water, usually droplets can pass between the pointed stem 71 of the needle 72 and the passage wall 70, so that the main head of water flowing out of the reservoir in a steady stream flows back from valve seat 64 upwardly out of the threaded end 68 of the extension pipe section 69, and through its bore 75, makes its way to the next needle valve controlled raw water distributing point in the line.

There is located at the lower part of the apparatus a suitable collection receptacle in which may drip the waters of condensation forming upon the inner surface of the outer member 75. This receptacle is an annular gutter 81 secured at its upper edge to member 75 just above the ground E. It has a fresh water collecting groove 83 therein, the curved edge 82 of which is out of contact with the inner member 55 as shown in Figure 5. A suitable drain hose 84 is connected at one end to the gutter 81 and at its free end it extends operatively into the upper end of a deposit receptacle 86, into whose interior 87 the pure water distilled from the apparatus may be collected at G, and drawn off for use for drinking purposes.

The present invention depends upon the radiation from the sun as the primary factor involved in the generation of pure drinking water from the still provided to carry out the distillation process automatically. It is important, in such cases, to utilize as much as is possible the rays of sunshine impinging upon the still, especially, where, as in one form of my invention, it floats on the sea. To this end, the parts of the present invention have been shaped and designed and coordinated so as to make possible attainment of this all pervading exposure to the sun of the heat evaporating surfaces of the floating still.

The floating still shown in Figs. 1, 2, 3 and 4 is made to have its parts collapse into compact form, when not in use, and in such form, several of the floating stills can be placed in a raft to be tied together so that the occupant may have a line of stills floating behind his conveyance, if desired, each one supplying him with its quota of pure drinking water. Since the lower or south pole of the fully inflated drum 10 has an opening 30b, in order to set the device for proper operation and control the open end of the drum is immersed directly into the body of ocean water or the like, which will seal it effectively upon injection of air under pressure into the interior space of the drum. The strainer 30 is a cloth drain, which, when wetted thoroughly, prevents air from escaping through the cloth of the drain until the drum is sufficiently inflated. Inflation of the drum and distension of the encased heat absorbing membrane 13 is necessary in order to arrange the absorbent surfaces in proper upright positions, effective to carry through the process of distillation of the raw water. Inflation is done either by taking hold of the hose 49 and forcing air thereinto by way of the filler tube 50, after removing the stopper 52 therefrom, or it may be effected in any other manner. As the drum 10 is being filled with air, the sides thereof become distended, and extend outwardly to assume a spherical shape. As this takes place the walls of the substantially polyhedral inner member 13 are lifted upwardly by the walls of the drum to which they are attached, until they assume the positions shown in Figure 1, at the time that the still is round and firm.

It will be noticed from Figure 1 that the indentable portions 23 of the inner surface of drum 10 serve the double purpose of supporting polyhedral bag 13, in relation to the enclosing walls of drum 10 as well as for the purpose of indicating when the still is properly inflated, because when this is effected these points will be indented and plainly show this on the outside surface of the transparent drum 10. When the bag is sufficiently inflated the excess air may escape through the drainer or strainer cloth 30. This operation so far is done on the raft. The still is now ready to be placed overboard and deposited in the salt water of the ocean, at which time the salt water reservoir 39—40 is ready to be filled. This is done by taking a cup or other pouring vessel, dipping it repeatedly into the ocean and discharging the contents therefrom into the funnel 44 at the upper end of the still. As the reservoir fills with salt water part of same will pass through the hose 46 and fill the ballast tube 25 progressively, and when this tube is filled, it will be found that the still will float in a buoyantly balanced upright position in such a manner that only the inappreciable portion of the drum beneath the ballast tube will be immersed into the ocean. The tube and its superimposed pneumatically inflated light still will float upon the body of water. The user will hold the still upright while filling same, and after the same assumes the necessary upright position, he will put the stopper 52 back in the filler tube 50, and locate the hose 49 so that its filler end 50 rests operatively upon the flange 11 of the float, supported out of contact with the ocean. With the parts in the positions just described, sea water begins to drip on the black cloth or material of the inner drum 13, and the work of distillation begins, when the still is exposed to the rays of sun. Only driblets of raw water is discharged from the distributing reservoir 39, which emerge through the guide tube 38. The top of the funnel shaped diaphragm or member 27 acts to collect excess salt water.

The drain 30 performs the function of discharging excess salt water without allowing air pressure within the still to escape. Since the inner sphere of this floating still is substantially spherical in contour it follows that it does not have to be oriented to the sun, and since all surfaces of the outer and inner members 10 and 13 are in upright position, located above the water line of the ocean on which the still floats, it is obvious that the heat and water absorbing member 13 presents a substantially constant projection normal to the sun and regardless of the sun's rays or direction or elevation.

It will be seen that the dimensions of the guide tube 38 and of the string element 37 are made so as to feed an excess of salt water so that more water is fed than is actually distilled. The pull string 37, passing through the guide tube 38 enables only measured amounts of raw water to drip down this tube because the passageway for the emerging water is constricted. That part of the mobile films of the raw water present on the sides of the heat absorbing bag 13 which constitutes excess amounts of raw water not undergoing evaporation from the rays of the sun, washes the surface of the bag exposed to the sun free of foreign impurities. Since the inflatable membrane 10, in spherical form, is air sealed when the drain 30 is wetted thoroughly, as for instance when immersed into the ocean in the act of floating the still, it constitutes means for automatically keeping the air pressure from exceeding its rated predetermined value. Any air pressure exceeding this value would escape through drain 30 until the proper pressure was again re-established. The excess raw water of the distributer 39—40 continues to emerge out from the drain 30, without loss of internal air pressure. The upper part of the distributer obtains its rigidity from the fact that its conical shape makes it so when filled with water or other fluid. The device cannot be overinflated because of the porous drain 30, which is preferably a cloth salt water sieve. The drain can be kept wet at all times by the excess salt water or contaminated water which passes through the solar still, even when not used on any navigable body of water or when towed from a life raft.

The still operates on the principle of a continuous supply of fresh salt water fed to it. It cannot be over-inflated because of the porous drain construction at 30. The still cannot be upset in a rough water because of its spherical condensing surface. The removal of salt from the salt water is accomplished by distillation. The rays of the sun heat the sea water that drips on the black evaporator cloth stretched in the center of the still in formation of the bag 13, which causes constant evaporation. The vapor condenses on the sides of the cover or drum 10, in little beads which run down to the fresh water trap or collection receptacle in the bottom of the still. As soon as the still begins to float unaided manually, and the process of dripping of the raw water upon the evaporator cloth of the bag starts, the still is in full operation, which continues automatically and steadily as long as the still is exposed to the rays of the sun and kept filled in its reservoir with fresh salt water and largely because the still is kept away from shadows. If the still becomes flabby, it is necessary to blow in more air until suspension points 53 of the bag indent. It is always proper to keep the still firmly inflated. The still becomes flabby when the black evaporator cloth of the bag touches the sides of the drum and contaminates the freshly evaporated water with salt. This must be avoided. Several minutes after the still is put to work it begins depositing fresh water into the collecting receptacle 32. When in operation, and viewed carefully the still will be found to present a silvery appearance contributed by the condensation of fresh water on inside of the bag. If the upper half of the bag should lose its silvery appearance in spots, the still is not functioning properly at full capacity. The operator then pulls on the string 37 to clear the water feed guide tube 38 of foreign matter lodged therein.

I will now describe the use of the still on land, where it need not be inflated and rendered buoyant for floating purposes. There are numerous areas throughout the world which lack suitable drinking water and which depend on either rain water or even importation of water from the outside. The invention illustrated in Figs. 5 and 6 is adapted for such land use and has the quality of entailing no cost for operation or maintenance thereof, nor labor in attending to the distillation process. During a period of drought when there is little or no rainfall, the still here shown works at its best. The manner in which the still, for land use, functions is identically similar to the process already described hereinbefore. There is a uniformly spaced interval between the two membranes 55 and 75 throughout their lengths. The parts assume the likeness of two conical tents supported by one common central pole or post with a substantially uniform air space therebetween. The raw water is regulated by the needle valve 72, to discharge raw water through the faucets or tubes 60 at a fairly constant rate of discharge. Because of the wettable nature of the material composing the inner tent 55, the impure salt water from the reservoir is uniformly distributed over its surface, in the downward flow of the liquid. The rays of the sun will penetrate the transparent tent 75 and will be absorbed by the tent 55 within with a resultant rise in temperature of the water contained in the surface of this tent. Since the outside tent 75 is exposed to the temperature of the surrounding air, a temperature differential exists whereby the impure water passing over the exposed surfaces of the inner tent 55 begins to distill and condense on the inside of the outer tent 75 in small droplets which run down the inner surface of the outer tent and are collected ultimately into the collection gutter which is built around the lower periphery of the outer tent 75, at which point fresh water is deposited fit for drinking purposes.

It is obvious that a series of these tent-like stills may be set up in any locality all connected together by pipe sections 69, to a common source of supply of impure water. The flow regulating needle valve 72 is adjusted so as to supply more water to the still than is distilled and the excess of this water is used to wash down the impurities left by the fraction of the water which was evaporated from the surface of the inner tent 55. This water which was used to thus wash out the impurities is itself discharged at the bottom of the periphery of the inner tent 55 so as to seep into the ground E.

I do not intend to confine myself to the exact details of construction disclosed herein, but cover all variations falling within the purview of the appended claims.

I claim:

1. A solar still comprising an outer transparent non-absorbent shell, said shell formed with an opening in the lower end thereof, a bag within said shell, means supporting said bag in spaced relation to the inner walls of said shell, said bag formed with an opening at the lower end thereof in registry with the opening of said shell, an annular ballast tube within said still surrounding said openings between the shell and bag, a salt water reservoir carried by said still between said shell and bag at the upper end thereof, a flexible connecting tube extending from said reservoir to said ballast tube for filling said ballast tube from said reservoir, means for feeding salt water from said reservoir on to said bag, a perforated condensate receptacle carried by said shell about said opening therein, and a flexible tube extending from said receptacle for drawing the condensate from said still and for admitting air into said shell and bag.

2. An inflatable solar still comprising an outer transparent non-absorbent cover formed with an opening in the lower end thereof, an absorbent bag within said cover spaced therefrom, said bag formed with an opening in the lower end thereof registering with said opening in said cover, an absorbent strainer closing the opening in said cover, a salt water receptacle carried by said still at the upper end thereof, an annular ballast tube in said still surrounding said openings at the lower end of said still, a condensate receptacle carried by said cover above the opening therein, a flexible tube extending from said condensate receptacle through which air may be admitted for inflating said still and through which the condensate may be removed, means admitting salt water to be deposited on said absorbent bag, and a tubular connection between said salt water receptacle and said ballast tube whereby admission of salt water into said receptacle will also admit water into said ballast tube.

ALEXIS E. USHAKOFF.

REFERENCES CITED

The following references are of record in the file of this patent:

UNITED STATES PATENTS

| Number | Name | Date |
| --- | --- | --- |
| 102,633 | Wheeler | May 3, 1870 |
| 1,812,516 | Dooley | June 30, 1931 |
| 2,393,291 | Delano | Apr. 9, 1946 |
| 2,402,737 | Delano | June 25, 1946 |
| 2,405,118 | Delano | Aug. 6, 1946 |
| 2,405,877 | Delano | Aug. 13, 1946 |
| 2,412,466 | Miller | Dec. 10, 1946 |